(12) United States Patent
Duke et al.

(10) Patent No.: US 7,479,316 B2
(45) Date of Patent: Jan. 20, 2009

(54) EXTRUDED BINARY SEAL

(75) Inventors: Jeremy Duke, Lexington, TN (US); Eric Frey, Lexington, TN (US); Kenneth Scott Jackson, Lexington, TN (US); John Mobley, Lexington, TX (US); Francis V. Rolland, Rochester Hills, MI (US); Edi J. Wink, Shelby Township, MI (US)

(73) Assignee: Dayco Products, LLC, Miamisburg, OH (US)

( * ) Notice: Subject to any disclaimer, the term of this patent is extended or adjusted under 35 U.S.C. 154(b) by 110 days.

(21) Appl. No.: 11/150,166

(22) Filed: Jun. 13, 2005

(65) Prior Publication Data

US 2006/0280887 A1 Dec. 14, 2006

(51) Int. Cl.
*B32B 1/08* (2006.01)
(52) U.S. Cl. .................. 428/36.91; 428/34.1; 428/35.2; 428/35.4; 428/35.7; 428/36.6; 428/36.7; 428/36.8; 428/36.9
(58) Field of Classification Search ................ 428/34.1, 428/35.2, 35.4, 35.7, 36.6, 36.7, 36.8
See application file for complete search history.

(56) References Cited

U.S. PATENT DOCUMENTS

| 4,147,824 | A | 4/1979 | Dettman et al. |
| 4,720,113 | A | 1/1988 | Hertz, Jr. |
| 5,459,202 | A | 10/1995 | Martinez et al. |
| 6,243,990 | B1 | 6/2001 | Cornils et al. |
| 6,270,082 | B1 | 8/2001 | Hegemier |
| 6,365,250 | B2 | 4/2002 | Shifman et al. |
| 6,686,012 | B1 | 2/2004 | Molnar et al. |
| 6,790,526 | B2 * | 9/2004 | Vargo et al. ................. 428/343 |
| 2004/0142135 | A1 * | 7/2004 | Verschuere et al. ...... 428/36.91 |

OTHER PUBLICATIONS

Merriam-Webster Online Dictionary definition of "gasket".*

* cited by examiner

*Primary Examiner*—Rena L Dye
*Assistant Examiner*—Walter B Aughenbaugh
(74) *Attorney, Agent, or Firm*—Joseph V. Tassone

(57) ABSTRACT

An extruded multilayer seal member having an expanded temperature range and an improved compression set resistance wherein the seal member comprises a first fluoroelastomer as the inner layer of the multilayer seal member and a second elastomer as the outer layer of the multilayer seal member; and a method for manufacturing the multilayer seal member which comprises extruding a multilayer tubular structure, crosslinking the extruded multilayer tubular structure on a mandrel, cutting the multilayer tubular structure to provide a plurality of uniform seal members and recovering the seal members, are described.

13 Claims, 2 Drawing Sheets

EXTRUDED BINARY SEAL

BACKGROUND OF THE INVENTION

The present invention relates generally to seals, and more particularly to multilayer, extruded seals having a wider temperature stability range and a lower compression set resistance, and to a method for the manufacture of such seals as well as to the use of such seals between an automotive engine the air intake manifold.

In recent years there have been numerous restrictions and regulations imposed upon manufacturing industries in general and particularly upon automotive manufacturers, which are intended to reduce the amount of potentially harmful contaminates from being released into the environment by such industries. In the automotive industry, such regulations and restrictions severely limit the amount of hydrocarbon fuel vapor and other chemical materials that can permeate from of motor vehicles. The regulations and restrictions have a dramatic impact on the manufacture and use of polymeric and rubber components such as seal members used in the automotive industry. Typically, the various seals employed in the automotive industry are molded and are composed of fluoroelastomer rubber materials. However, these molded fluoroelastomer seals are relatively expensive to manufacture due, in part, to the slow production cycling time and, in part, to the expensive tooling required for the manufacture of such molded seals. Furthermore, such molded seals are prone to excess parting line flash, which can lead to a separate operation to remove the parting flash from each individual seal. In some instances the parting flash may be severe enough to lead to total rejection of the seals.

Accordingly, there is a need in the automotive industry for an improved seal member for use in automotive industry as a seal member between the air intake manifold and the automotive engine, which not only meets industry standards for fuel emission, but also is able to perform well over a wide temperature range and, at the same time, exhibit a low compression set resistance; and for a method for manufacturing such automotive seals which overcomes the high costs and manufacturing problems associated with the manufacture of prior seals.

SUMMARY OF THE INVENTION

In accordance with the invention, a seal member having the desired characteristics which meet the present industry permeation standards and which is relatively inexpensive to manufacture is provided by extruding a multilayer material to form a tubular structure, crosslinking the layers of the multilayer material together, and cutting the tubular structure to obtain a plurality of individual seal members having the desired characteristics and structure.

The materials employed in the manufacture of the seal member may include two or more different materials to impart the desired performance characteristics to the seal. Generally, the seal member will comprise an inner layer of a fluoroelastomer and an outer layer of elastomer material, which is typically a non-fluoroelastomer, disposed on the outer surface of the fluoroelastomer layer.

The seal member s manufactured by extruding an elongated, multilayer tubular structure. The term tubular structure is meant to include a structure exhibiting circular, oval, elliptical, rectangular, square or any other shape. After the tubular structure has been formed, it is crosslinked and then cut perpendicular to the longitudinal axis of the tubular structure to form a plurality of seal members having a predetermined uniform profile configuration determined by the shape of the tubular structure.

The multi-layer configuration of the seal members of the present invention results in seal members having wider temperature range and lower compression set resistance. The extrusion and cut cycle times associated with the seal members manufactured in accordance with the present invention are much lower than the manufacturing times associated with molded seals. Also, since the seals manufactured in accordance with the invention are not molded, the present seals are free of excess flashing commonly associated with the manufacture of prior seal members.

DETAILED DESCRIPTION OF THE INVENTION

Elastomeric seal members for use in automotive fuel systems to prevent the release of hydrocarbon fuel vapors into the atmosphere are generally made out of a fluoroplastic material by a molding process, which is expensive and requires time-consuming steps. The automotive seal members of the present invention are superior to prior art seal members in that the present seal members are multilayer seal members which are not only more economical to produce but have improved sealing characteristics.

According to the invention, the automotive seal members of the present invention comprises a multilayer automotive fuel system seal member suitable for sealing a first fuel system component to a second fuel system component, said multilayer seal member comprising a first tubular layer of fluoroelastomer material having an inner surface and an outer surface and a second tubular layer of elastomer material around the first circumferential fluoroelastomer layer, the elastomeric material having an inner surface and an outer surface, the first fluoroelastomer layer and the second elastomer layer forming a pair of opposed substantially parallel rim surfaces perpendicular to the first circumferential layer of fluoroelastomer material and to the second circumferential layer of elastomer material wherein the width of said seal member is defined by the distance between the pair of opposed substantially parallel rim surfaces.

Figure 1:
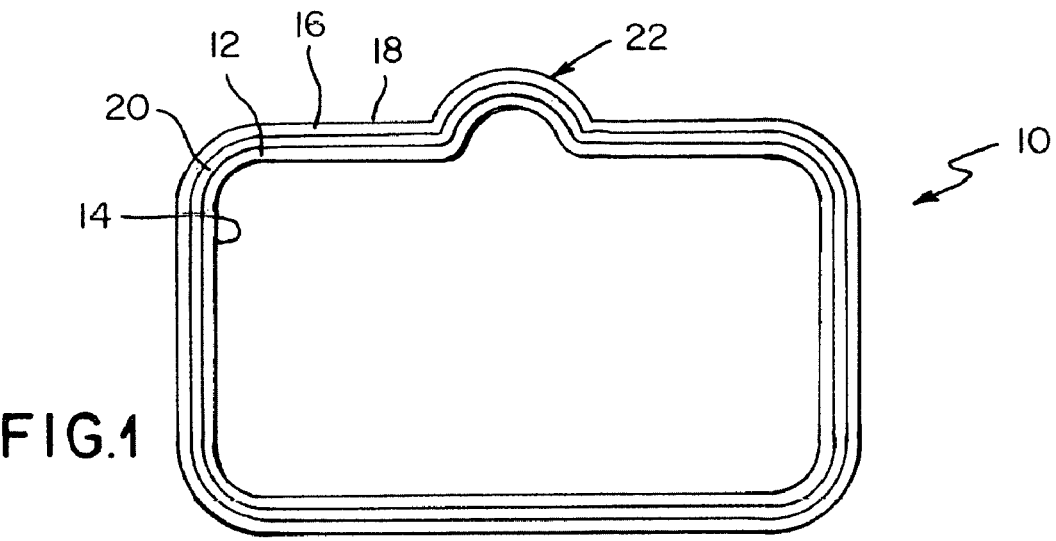
FIG. 1 is a cross sectional view of a multilayer seal member of the present invention.
Figure 4:
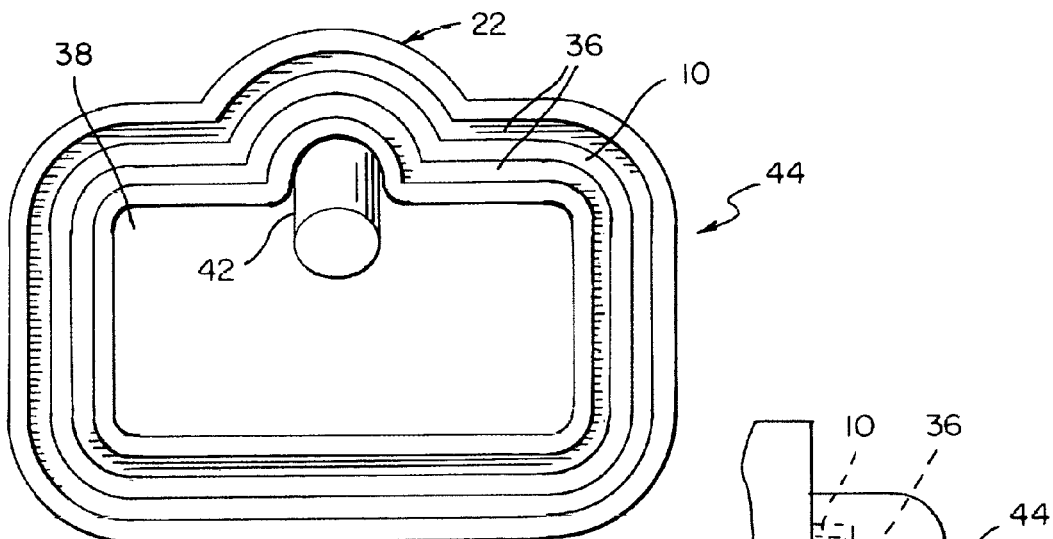
FIG. 4 is a cross-sectional view of a typical air intake manifold port having the seal member of the present invention disposed therein.
Figure 5:
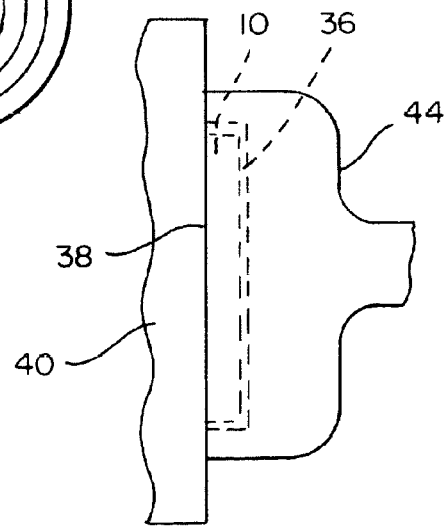
FIG. 5 illustrates an automotive air intake manifold sealed to an automotive engine using the seal of FIG. 1.

Referring to the drawings, FIG. 1 illustrates a multilayer seal member 10 of the present invention where, in one manifestation, the seal member 10 exhibits a rectangular configuration. While the seal member 10 of FIG. 1 is shown having a rectangular configuration, the seal member 10 may take any other desirable shape or configuration as described later. The seal member 10 comprises a first fluoroelastomer material 12 forming the interior surface 14 of the seal member 10, a second non-fluoroelastomer material 16 forming the exterior surface 18 of the seal member 10, and an optional intermediate layer 20 of a fluoroplastic material between the first fluoroelastomer material 12 and the second non-fluoroelastomer material 16. The seal member 10, as shown in FIG. 1, exhibits an annular profile having a notch 22 which represents a deviation from the otherwise relatively smooth interior and exterior surfaces 14 and 18, respectively of the seal member 10. The notch 22 is configured to accommodate a fuel injector 42 (FIG. 4). Typically, the notch 22, which extents the longitudinal length of the tubular structure 24, is formed and, subsequently fixed in the inner and outer layers of the tubular structure 24 as the tubular structure 24 is placed on the mandrel 22 (FIG. 2) and crosslinked. The mandrel 26 has an offset protrusion 28 extending the length of the mandrel 26 which corresponding to the shape and dimensions of the notch 22. The notch 22 may or may not be formed in every seal member and may or may not take the shape illustrated in FIG. 1. It is to be understood that the shape of the connecting fuel system will determine the presence of the notch 22 and its particular shape.

The seal member 10 is manufactured from a multilayer tubular structure 24, the layers of which are extruded by known extrusion methods, such as co-extrusion or tandem extrusion. According to the invention, the extruded multilayer tubular structure 24 (FIG. 2) is then placed on a mandrel 26 having the required configuration for forming the seal member 10. The tubular structure 24 is then crosslinked on the mandrel 26 and cut into a plurality of seal members 10 having the desired thickness.

Figure 2:
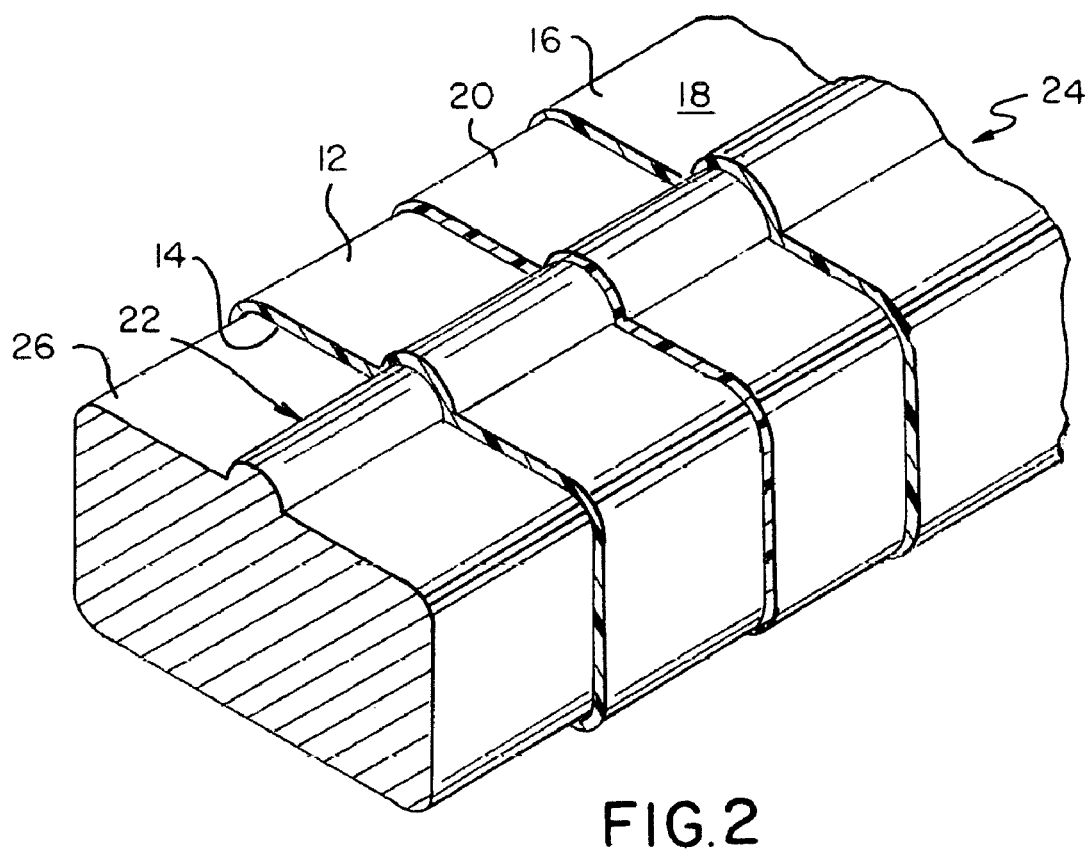
FIG. 2 is a fragmentary perspective view of multilayer tubular structure on a shaping mandrel with the various layers of the tubular structure broken away for purposes of illustration.

As shown in FIG. 2, the extruded multilayer tubular structure 24 having an inner fluoroelastomer layer 12, an outer elastomer layer 16 and an intermediate fluoroplastic layer 14 is placed around a mandrel 26 having the desired configuration for the tubular structure 24. The tubular structure 24 is then crosslinked to permanently establish the desired configuration.

Figure 3:
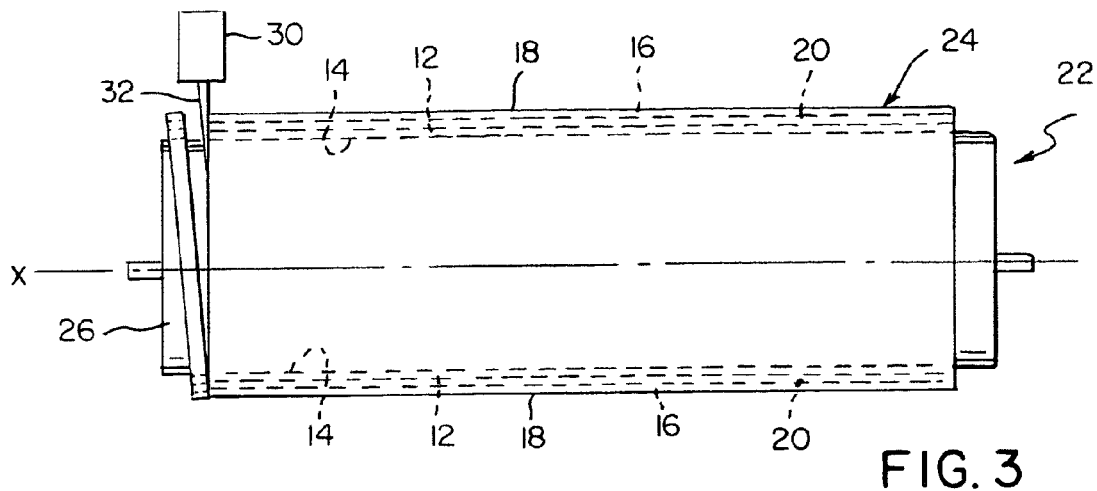
FIG. 3 is a plan view illustrating the formation of the multiplayer seal member of FIG. 1 from the tubular structure of FIG. 2 using a lathe.

After the tubular structure 24 has been crosslinked, it is cut into a plurality of individual seal members. As shown in FIG. 3, the crosslinked tubular structure 24 is cut into the plurality of seal members 10 using a lathe 30 having a blade 32 associated therewith. While any cutting instrument and any cutting technique capable of cutting the tubular structure 24 may be employed to provide the seal members 10 of the invention, it is preferred to use a lathe having a a blade associated therewith effect the cutting operation. According to the invention the tubular structure 24 may be cut sequentially to form the seal members 10 one at a time using a single blade, or a plurality of the seal members 10 may be formed simultaneously using a plurality of precisely spaced apart blades to cut the tubular structure 24.

As shown in FIG. 4, a seal member 10 is disposed in a groove 36 around an air intake manifold port 38 such that, when the air intake manifold 38 is installed on an automotive engine, the seal member 10 forms a seal between the air intake manifold 44 and the automotive engine 40. The notch 22 is formed in the seal member 10 to accommodate the fuel injector 42.

The first elastomer material which forms the inner surface of the extruded tubular structure is an FKM fluoropolymer. FKM fluoropolymers are commonly known as fluoroelastomers or fluororubbers of the polymethylene type that utilizes vinylidene fluoride as a co monomer and has substituent fluoro, alkyl, perfluoroalkyl or perfluoroalkoxy groups on the polymer chain with or without a cure site monomer (having a reactive cure site). Generally, FKM fluoropolymers include dipolymers of hexafluoropropylene and vinylidene fluoride; terpolymers of tetrafluoroethylene, vinylidene fluoride and hexafluoropropylene; terpolymers of tetrafluoroethylene, fluorinated vinyl ether and vinylidene fluoride; terpolymers of tetrafluoroethylene, propylene, and vinylidene fluoride; and pentapolymers of tetrafluoride, hexafluoride, vinylidene fluoride, ethylene, and a fluorinated vinyl ether. Typically, the FKM fluoropolymers of the present invention are fluoroelastomers selected from the group consisting of polyvinylidene tetrafluoride, polyvinylidene trifluoride, polyvinylidene difluoride, polyvinyl fluoride, polyvinylidene fluoride, polytrifluoromonochloroethylene, polytetrafluoroethylene, polyhexafluoropropylene, polydifluoroethylene, polytetrafluoroethylene, fluorosilicone, ethylene-tetrafluoroethylene copolymer, hexafluoropropylene-tetrafluoroethylene copolymer, hexafluoropropylene-difluoroethylene copolymer, perfluoroalkoxytetrafluoroethylene copolymer, tetrafluoroethylene-hexafluoropropylene-vinylidene fluoride terpolymer, and the like, and blends thereof. Preferably, the fluoroelastomer forming the inner layer of the seal member and is hexafluoropropylene-difluoroethylene copolymer.

The second elastomer material which forms the outer surface of the extruded tubular structure is a non-fluoroelastomer selected from the group consisting of an ethylene-acrylic copolymer (AEM), a polyacrylate (ACM), an ethylene-vinyl acetate rubber (EVM), a nitrile-butadiene rubber (NBR), a hydrogenated nitrile-butadiene rubber (HNBR), an ethylene-propylene-diene terpolymer (EPDM), a polybutadiene, a polyisoprene, a silicone rubber, and the like, and blends thereof. Preferably, the second elastomer which forms the outer layer of the seal member is an ethylene-acrylic copolymer.

In some instances, it may be desirable to use certain fluoroelstomers which have an affinity for hydrocarbons, such as fluorosilicone, as an inner material covered with a second fluoroelastomer material to provide the first fluoroelastomer layer of the seal member, and a non-fluoroelastomer as the outer layer of the seal member. The fluorosilicone material would adsorb the hydrocarbons which would then be purged from the fluorosilicone when the engine is running.

In a particularly preferred embodiment of the invention the seal member includes a thin intermediate barrier layer between the first FKM fluoropolymer layer and the outer non-fluoroelastomeric layer to prevent or significantly reduce the permeation of hydrocarbon fuel vapors to the atmosphere. Typically, the intermediate layer is a fluoroplastic material such as tetrafluoroethylene-hexafluoropropylene-vinylidene fluoride (THF), polyvinylidene fluoride (PVDF), ethylene-fluoroethylene-propylene (EFEP), fluoroethylene-propylene (EFP), ethylene-tetrafluoroethylene (ETFE), and the like, or blends thereof. Preferably the intermediate barrier layer is a tetrafluoroethylene-hexafluoropropylene-vinylidene terpolymer. It is to be understood that the term "copolymer" as used in the present includes copolymers, terpolymers, tetrapolymers, pentapolymers, etc.

In some instances it may be desirable to employ an additional layer of adhesive between certain layers to enhance the adherence of those layers. For example, where a fluoroplastic barrier layer is employed as a third layer between the fluoroelastomer inner layer and the elastomer outer layer, an adhesive such as those commonly used to bond the particular materials to each other may be used to obtain good adhesion between the fluoroelastomer layer and the fluoroplastic layer and between the fluoroplastic layer and the elastomer layer. Typically, the adhesive is an amine-based adhesive.

The thicknesses of the various layers which make up the seal member is predetermined and depends upon the particular use of the seal member. Typically, the first fluoroelastomer forming the inner layer has a thickness of about 0.1 to 5.0 mm, preferably about 0.2 to 2.0 mm; and the second elastomer forming the outer layer has a thickness of about 0.1 to 5.0 mm, preferably about 0.2 to 2.0 mm.

The width of the seal member, is also predetermined and depends upon the particular use of the seal member. The width of the seal member is measured from the outer surface of one lateral side of the seal member to the outer surface of the other lateral side of the seal member. Typically, the width of the seal member ranges from about 1 to 30 mm, preferably about 3 to 20 mm.

According to a preferred method for the manufacture of the seal members of the invention, a multilayer tubular structure is first extruded to form a multilayer tubular structure. After the tubular member is extruded, it is placed on a mandrel or mold which corresponds to the particular configuration desired. The seal member is heated on the mandrel or mold to form the desired configuration and then crosslinked to fix the configuration of the seal member. The crosslinked tubular member is cut into individual seal members. In a preferred aspect, the seals of the invention are formed by uniformly cutting the cured tubular structure perpendicularly to the longitudinal axis of the tubular structure, with a blade having a blade edge perpendicular to the X-axis of the tubular structure. Any cutting apparatus which would serve to cut the tubular structure into the desirable seals may be used. The cutting operation may be performed with the tubular structure on or off the mandrel. Preferably, the cutting operation is carried out using a lathe The crosslinking agent employed in the present invention includes peroxides, polyols, dihydroxy, bisphenol, polyamines, and the like. Preferably, the crosslinking agent is a peroxide such as 2,5-dimethyl-2,5-di(t-butylperoxy)-hexyne-3; 2,5-dimethyl-2,5-di(t-butylperoxy)-hexane; 1,1-bis(t-butylperoxy) hexene-3, t-butylperoxybenzoate,dicumyl peroxide; dibenzoyl peroxide; t-butyl perbenzoate; and mixtures thereof. It may be desirable to use a co-agent in combination with the peroxide crosslinking agent. Suitable co-agents include triallyl cyanurate, triallyl isocyanurate, trimethallyl isocyanate, tris(diallylamine-s-triazine, triallyl) phosphate, and mixtures thereof.

The multilayer seal member of the present invention exhibits excellent stability or a wide temperature range, has a high resistance to hydrocarbon fuel permeability and has low compression set resistance. The physical characteristics of the present seal members make them useful in a wide variety of application. Such seal members are particularly useful in the automotive fuel systems where structure reliability and reduced hydrocarbon fuel vapor permeation are required. In a particularly preferred application, the seal members of the invention are employed in the automotive industry as a seal member disposed between the air intake manifold and the automotive engine.

Various additives such as pigments or other colorants may be added to the first fluoroelastomer material and/or to the second elastomer material to meet certain distinguishing specifications. For example, one of the elastomer layers may be colored a particular color and the other elastomer layer colored a different color. Typically, the outer elastomer layer is black and the inner fluoroelastomer layer is of a color other than black.

While the present invention has been described and illustrated herein, it is to be understood that certain variations, changes and modifications may be made to the invention without departing from the spirit and scope of the invention as defined by the appended claims.

What is claimed is:

1. A crosslinked, extruded air intake manifold gasket for sealing an air intake manifold to an automotive engine, said crosslinked, extruded air intake manifold gasket comprising:
   an inner-curvilinear segment, wherein said inner curvilinear segment consists of a fluoroelastomer material selected from the group consisting of polyvinylidene tetrafluoride, polyvinylidene trifluoride, polyvinylidene difluoride, polyvinyl fluoride, polyvinylidene fluoride, polytrifluoromonochloroethylene, polytetrafluoroethylene, polyhexafluoropropylene, polydifluoroethylene, polytetrafluoroethylene, fluorosilicone, ethylene-tetrafluoroethylene copolymer, hexafluoropropylene-tetrafluoroethylene copolymer, hexafluoropropylene-difluoroethylene copolymers, perfluoroalkoxytetrafluoroethylene copolymer, tetrafluoroethylene-hexafluoropropylene-vinylidene fluoride terpolymer, and blends thereof; and
   an outer curvilinear segment, wherein said outer curvilinear segment consists of a non-fluoroelastomer material selected from the group consisting of ethylene acrylic copolymer, polyacrylate, ethylene-vinyl acetate rubber, nitrile-butadiene rubber, hydrogenated nitrile-butadiene rubber, ethylene-propylene-diene terpolymer, polybutadiene, polyisoprene, silicone rubber, and blends thereof wherein said inner curvilinear segment and said outer curvilinear segment are co-planar with respect to one another, said air intake manifold gasket exhibiting wider temperature range and lower compression set resistance compared to conventional molded air intake manifold gaskets while being free of undesirable excess flashing associated with said conventional molded air intake manifold gaskets.

2. The air intake manifold gasket of claim 1 wherein said air intake manifold gasket has a width of about 1.0 to 20 mm.

3. The air intake manifold gasket of claim 1 wherein said inner segment of fluoroelastomer material has a thickness of about 0.2 to 5 mm and said outer segment of non-fluoroelastomer material has a thickness of about 0.2 to 5 mm.

4. The air intake manifold gasket of claim 1 wherein said fluoroelastomer material is hexafluoropropylene-difluoroethylene copolymer.

5. The air intake manifold gasket of claim 1 wherein said non-fluoroelastomer material is an ethylene-acrylic copolymer.

6. The air intake manifold gasket of claim 1 further comprising a fluoroplastic material disposed between said fluoroelastomer material and said non-fluoroelastomeric material wherein said fluoroplastic material is selected from the group consisting of tetrafluoroethylene-hexafluoropropylene-vinylidene fluoride (THF), polyvinylidene fluoride (PVDF), ethylene-fluoroethylene-propylene (EFEP), fluoroethylene-propylene (LFP), ethylene tetrafluoroethylene (ETFE), and blends thereof.

7. The air intake manifold gasket of claim 6 wherein said fluoroplastic material is a tetrafluoroethylene-hexafluoropropylene-vinylidene fluoride terpolymer.

8. The air intake manifold gasket of claim 6 further including an adhesive between at least one of said inner curvilinear segment of fluoroelastomer material and said fluoroplastic material, and said fluoroplastic material and said outer segment of elastomeric material.

9. The air intake manifold gasket of claim 8 wherein said adhesive is an amine-based adhesive.

10. The air intake manifold gasket of claim 1 wherein said air intake manifold gasket includes a notch therein for accommodating a fuel injector.

11. In an air intake manifold gasket for sealing an air intake manifold to an automotive engine, the improvement wherein said air intake manifold gasket is a crosslinked, extruded air intake manifold gasket comprising:

an inner curvilinear segment wherein said inner curvilinear segment consists of a fluoroelastomer material selected from the group consisting of polyvinylidene tetrafluoride, polyvinylidene trifluoride, polyvinylidene difluoride, polyvinyl fluoride, polyvinylidene fluoride, polytrifluoromonochloroethylene, polytetrafluoroethylene, polyhexafluoropropylene, polydifluoroethylene, polytetrafluoroethylene, fluorosilicone, ethylene-tetrafluoroethylene copolymer, hexafluoropropylene-tetrafluoroethylene copolymer, hexafluoropropylene-difluoroethylene copolymer, perfluoroalkoxytetrafluoroethylene copolymer, tetrafluoroethylene-hexafluoropropylene-vinylidene fluoride terpolymer, and blends thereof; and an outer curvilinear segment wherein said outer segment is a non-fluoroelastomer material selected from the group consisting of ethylene acrylic copolymer, polyacrylate, ethylene-vinyl acetate rubber, nitrile-butadiene rubber, hydrogenated nitrile-butadiene rubber, ethylene-propylene-diene terpolymer, polybutadiene, polyisoprene, silicone rubber, and blends thereof, wherein said inner curvilinear segment and said outer curvilinear segment are co-planar with respect to one another, said polymeric air intake manifold gasket exhibiting wider temperature range and lower compression set resistance compared to conventional molded air intake manifold gaskets while being free of undesirable excess flashing associated with said conventional molded air intake manifold gaskets.

12. The air intake manifold gasket of claim 11 wherein said fluoroelastomer material is hexafluoropropylene-difluoroethylene copolymer.

13. The air intake manifold gasket of claim 11 wherein said non-fluoroelastomer material is an ethylene-acrylic copolymer.

* * * * *